(No Model.)
G. H. CORLISS, Dec'd.
E. A. CORLISS, Administratrix.
ADJUSTMENT OF GIBS OF CROSS HEADS OF STEAM ENGINES.
No. 406,091. Patented July 2, 1889.
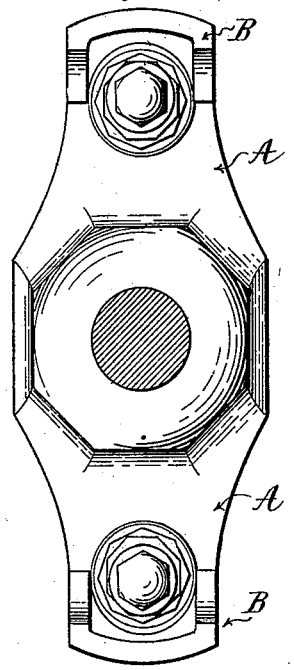
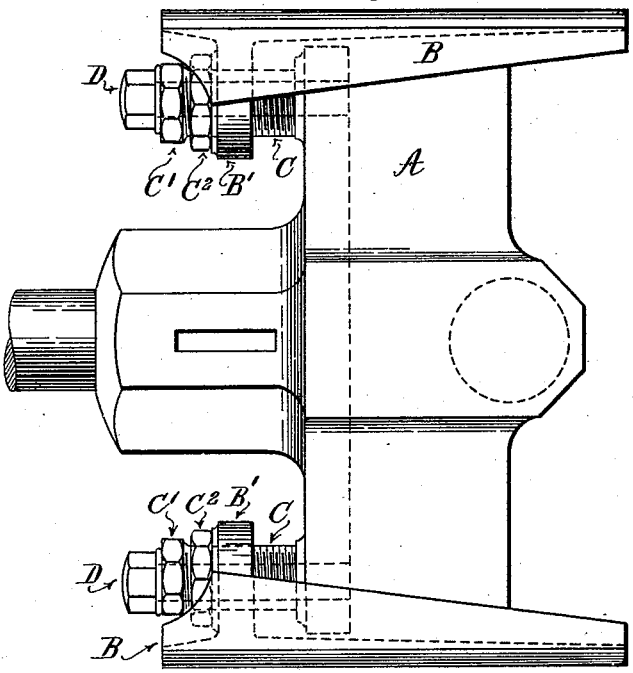
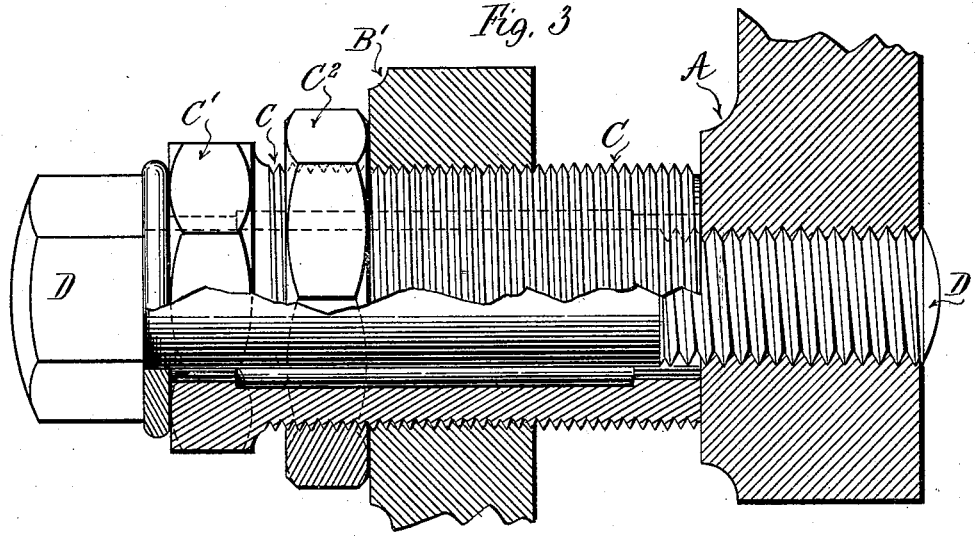
Witnesses
James Tribe
Henry Marsh Jr.
Inventor
George H. Corliss
by Emily A. Corliss,
Administratrix.
N. PETERS, Photo-Lithographer, Washington, D. C.

UNITED STATES PATENT OFFICE.

EMILY A. CORLISS, OF PROVIDENCE, RHODE ISLAND, ADMINISTRATRIX OF GEORGE H. CORLISS, DECEASED.

ADJUSTMENT OF GIBS OF CROSS-HEADS OF STEAM-ENGINES.

SPECIFICATION forming part of Letters Patent No. 406,091, dated July 2, 1889.

Application filed July 13, 1888. Serial No. 279,896. (No model.)

*To all whom it may concern:*

Be it known that GEORGE H. CORLISS, deceased, late a citizen of the United States, and a resident of the city and county of Providence, in the State of Rhode Island, did invent a new and useful Improvement in the Means of Adjusting the Gibs of Cross-Heads for Steam-Engines and Analogous Machinery, of which the following is a specification.

In the Letters Patent of the United States, No. 298,068, granted to said George H. Corliss, for improvement in cross-heads, dated May 6, 1884, is set forth and claimed an adjustment of the gibs of cross-heads by means of two threaded bolts and a check set-screw situated between them, with the centers of the three on the same straight line. To such construction there has in practical operation been found to exist the objection that in adjusting the two outside bolts undue pressure was liable to be exerted upon one more than upon the other, thereby twisting the gib or shoe out of the proper plane, which resulted in an uneven distribution of the friction between it and the guides.

In the present invention such objection is overcome by the use of a hollow externally-threaded sleeve, which is screwed into and extends through an ear on the gib, which is tapped to receive it, and is rigidly secured, after adjustment, by a check-nut taking a bearing against the outer face of said ear. The gib and cross-head are secured together by a bolt, threaded at one end, extending loosely through said sleeve longitudinally and screwed into the cross-head, thereby binding the gib and sleeve firmly to the cross-head. Adjustment of the gib is made by revolving the sleeve by means of a wrench applied to its outer end, squared for that purpose, and again tightening the bolt.

In the accompanying drawings, Figure 1 is a side view of a cross-head, the gibs, and adjusting means. Fig. 2 is an end view of the same, and Fig. 3 is on a larger scale. It is an elevation of the adjusting means, the sleeve being partly broken away, and the adjacent portions of the gib and cross-head being shown in section.

Similar letters of reference indicate like parts where they occur in all the drawings.

A is the cross-head, and B the gib provided with the ear B'.

C is the hollow sleeve externally threaded and provided with a squared end or head C', to which is applied a wrench to revolve the sleeve for purposes of adjustment, and with a check-nut $C^2$, which, taking a bearing against the outer face of the ear B', serves to rigidly secure the sleeve after adjustment of the latter.

D is a bolt, which, provided with a head at one end and threaded at the other end, extends loosely through said sleeve C longitudinally, and is screwed into the cross-head to bind the gib and sleeve firmly to the cross-head.

I claim as the invention of said GEORGE H. CORLISS, and desire to secure by Letters Patent—

1. The hollow externally-threaded sleeve C, bolt D, and a check-nut $C^2$, combined with each other and with a gib B, provided with an ear B', said ear being tapped to receive said sleeve, and said check-nut taking its bearing against the outer face of said ear B' and serving, as specified, to rigidly secure said sleeve after adjustment of the latter.

2. The described means of adjusting the gibs of a cross-head, the same consisting of a hollow sleeve C, externally threaded, and the bolt D, threaded at one end, combined with each other and with the gib B and cross-head A, all arranged as shown, and adapted to serve as specified.

In testimony whereof I, EMILY A. CORLISS, administratrix of said GEORGE H. CORLISS, have hereunto set my hand, at Providence, Rhode Island, this 29th day of June, 1888, in the presence of two subscribing witnesses.

EMILY A. CORLISS,
*Administratrix of estate of George H. Corliss.*

Witnesses:
HENRY MARSH, Jr.,
GEORGE F. CORLISS.